(No Model.)
G. LEVERICH.
LUBRICATOR FOR SHAFTING.
No. 435,434. Patented Sept. 2, 1890.
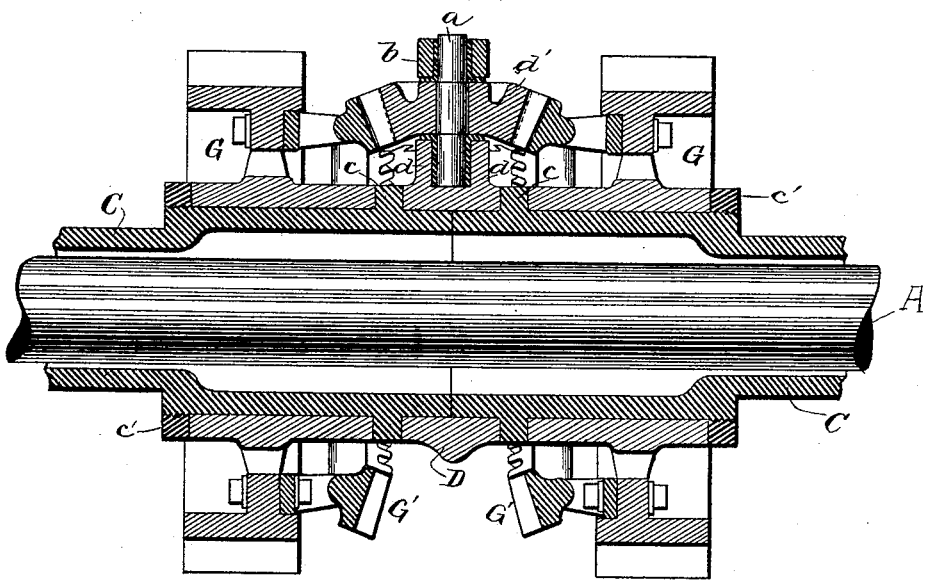
FIG. 1.
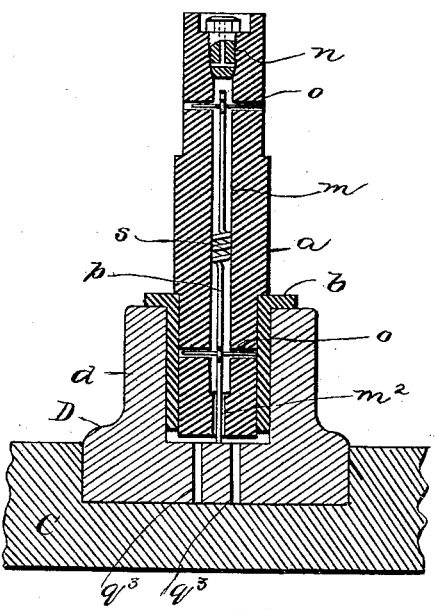
FIG. 2.
FIG. 3.
WITNESSES:
Frank S. Ober
Thomas K. Trenchard
INVENTOR
Gabriel Leverich.
BY 
ATTORNEY.

UNITED STATES PATENT OFFICE.

GABRIEL LEVERICH, OF MAPLEWOOD, NEW JERSEY.

LUBRICATOR FOR SHAFTING.

SPECIFICATION forming part of Letters Patent No. 435,434, dated September 2, 1890.

Original application filed January 18, 1890, Serial No. 337,359. Divided and this application filed May 17, 1890. Serial No. 352,160. (No model.)

*To all whom it may concern:*

Be it known that I, GABRIEL LEVERICH, a citizen of the United States, residing in Maplewood, in the county of Essex and State of New Jersey, have invented certain new and useful Improvements in Lubricators for Shafting, of which the following is a specification.

My invention relates to devices for lubricating shafting, and has special reference to such devices applied to the gear for driving the winding-drums of cable railways.

On most cable railways it is important that at all times the traffic shall be handled without interruption and delay, and therefore it is necessary that the driving mechanism may, without stopping and while in use, be surely and efficiently lubricated.

The object of the invention is to provide certain of the working parts not conveniently accessible when the plant is in operation with means for surely and efficiently lubricating them.

Accompanying and a part of this description are the drawings.

Figure 1 is a longitudinal section of such parts of the driving-gear as are necessary to illustrate the operation of this invention. Fig. 2 is a transverse section of the same, and Fig. 3 is an enlarged view in section of the lubricating device.

Referring first to the driving-gear as shown in Figs. 1 and 2, surrounding, but not in contact with the main shaft A, and midway between the pair of winding-drums to be driven, is a long sleeve or hollow shaft C. Each shaft runs in its own pillow-blocks, and the two are connected or disconnected by clutches, preferably one at each end of the hollow shaft and closed toward each other.

Extending radially outward from the spider D, loose on the hollow shaft at equal angular distances apart, are three pairs of arms $d^2$, and on the inside of each arm, at the outer end and radial to the shafts, is a longitudinal flat pad $h^2$. Joining the two pads of each pair of arms, closely fitted and secured thereto by the transverse bolts $f$ and the longitudinal bolt $f'$, is a segmental strut $d^3$, the axis of the longitudinal bolt being in the surfaces of the pad and strut end in contact. Thereby the strut will be held in place should the transverse bolts fail.

In the center of each strut is a boss. A similar boss $d$ is on the outside of the hollow shaft. These two bosses are bored out and fitted with the bushes $b$, of brass or other suitable material, to form the bearings in which one of the three radial shafts $a$, carrying a bevel-pinion $d'$, runs, the axis of each shaft being in a plane through the middle point of and normal to the hollow shaft and at an angular distance between the axes of one hundred and twenty degrees.

On the hollow shaft—one on each side of the bosses $d$ and next to the shaft-bearings—are two spur-pinions G, each of which engages with a spur-wheel (not shown) fixed on the shaft of one of a pair of winding-drums. These spur-pinions revolve loosely on the hollow shaft, being kept in position against the shoulder $c$ by the circular nuts $c'$, which screw upon the shaft near the bearings and are set up for adjustment, as may be necessary from wear of the rotating parts. They are afterward held in place by set-screws.

Extending inward from and bolted to each of the spur-pinions is the annular bevel-wheel G′, the two wheels engaging on opposite sides with the three beveled pinions $d'$.

For a more complete description and illustration of the operation of these parts, reference may be had to my application filed January 18, 1890, Serial No. 337,359, of which this application is a division.

To lubricate the journals of the radial shafts $a$ and also the bearings of the spider D on the hollow shaft, each radial shaft is bored out (see Fig. 3) nearly to its inner end, forming a cylindrical oil-chamber $m$, which is closed at its outer end by screw-plug $n$, terminating in a cone fitted oil-tight. Through this plug is an oil-passage, first along the axis to the cone and then across, as shown. At the center of each journal are the oil-passages $o$, each on a straight diametrical line across the shaft. There is also a similar passage $m^2$ from the bottom of the chamber on the axis of and to the end of the shaft. On each side of this axis, prolonged, are the two oil-passages $q^3$ through the hub of the spider to the inner bearing-surfaces. Loosely confined to the center of the chamber by the spiral $s$, wound therein for this purpose, is the wire $p$, of a diameter slightly less than that of the passage $m^2$, through which it extends to the bottom of the bearing $d$. This bearing is in depth somewhat greater than the length of the journal. Thereby an oil-space is left at the inner end of the shaft. In each of the passages $o$ a straight wire is loosely inserted, the wire $p$ at these points being bent permanently aside to allow a free crossing. These three wires are somewhat shorter than the distance between the confining-surfaces at their ends. The chamber is filled with oil through the plug $n$ by first turning it out slightly and then closed by screwing the plug tight. As each radial shaft $a$ revolves with the driving-shaft in one direction and on its journals in a direction normal to the other, the wire $p$ moves in and out and the wires in the transverse passages $o$ from side to side, and thus feed the oil to the bearings; but the motion alone of the wires in the passages $m^2$ and $o$ is not depended upon for the feed of the oil. The slight space between the wires and the walls of the passages causes a capillary feed of the oil to the outlets of said passages.

Having thus described my invention, I claim—

1. The combination, with a rotary piece of machinery, such as a shaft, of another piece of machinery mounted on the first-mentioned piece and rotating with it, but adapted to rotate independently of it, and lubricating devices for lubricating the bearing between the two pieces, consisting of one or more oil-vessels carried by said second piece communicating with said bearings, and plungers or pistons located freely in said vessels, whereby the rotation of said first-mentioned piece of machinery will cause a reciprocation of the plunger, for the purpose described.

2. The combination, with a spindle provided with the central oil-chamber, of the reciprocating rod of less length than the length of the oil-chamber and having one or more convolutions, for the purpose specified.

3. The combination, with a rotary shaft of an oil-chamber at an angle to the axis of the shaft and connected to said shaft to rotate with it and communicating with the bearings thereof, of a reciprocating rod contained within said chamber, whereby the rotation of the shaft will cause the said rod to reciprocate and feed the oil to the bearing, substantially as described.

4. An axle having a journal at each end and provided throughout its length with a chamber for the reception of a lubricant, and lateral passages extending from said chamber to the bearing-surfaces of each journal, in combination with wires contained in said passages, said wires being slightly shorter than the length of the passages, as described.

5. An axle having a journal at each end provided throughout its length with a chamber for the reception of a lubricant, and lateral passages extending from said chamber to the bearing-surfaces of each journal, in combination with wires contained in said passages.

In witness whereof I have hereunto signed my name in the presence of two subscribing witnesses.

GABRIEL LEVERICH.

Witnesses:
   THOMAS K. TRENCHARD,
   FRANK S. OBER.